(12) United States Patent
Han et al.

(10) Patent No.: US 11,286,350 B2
(45) Date of Patent: Mar. 29, 2022

(54) COMPOSITIONS, FILMS COMPRISING CURED PRODUCTS OF THE SAME, STACKED STRUCTURES COMPRISING THE FILMS, AND DISPLAY DEVICES

(71) Applicant: Samsung Electronics Co., Ltd., Suwon-si (KR)

(72) Inventors: Jung Im Han, Yongin-si (KR); Byung Ha Park, Yongin-si (KR); Dmitry Androsov, Suwon-si (KR); Hye Young Kong, Uijeongbu-si (KR); Ginam Kim, Seongnam-si (KR); Won Cheol Jung, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 28 days.

(21) Appl. No.: 16/661,650

(22) Filed: Oct. 23, 2019

(65) Prior Publication Data

US 2020/0181331 A1 Jun. 11, 2020

(30) Foreign Application Priority Data

Dec. 10, 2018 (KR) .................. 10-2018-0158344

(51) Int. Cl.
  *C08G 77/18* (2006.01)
  *C09D 5/00* (2006.01)
  *C09D 183/06* (2006.01)
  *G06F 3/041* (2006.01)

(52) U.S. Cl.
  CPC .............. *C08G 77/18* (2013.01); *C09D 5/00* (2013.01); *C09D 183/06* (2013.01); *G06F 3/0412* (2013.01)

(58) Field of Classification Search
  CPC .......... C08G 77/18; C08G 77/46; C09D 5/00; C09D 183/06; C09D 183/12; G06F 3/0412
  See application file for complete search history.

(56) References Cited

U.S. PATENT DOCUMENTS

| | | |
|---|---|---|
| 5,681,890 A | 10/1997 | Tanaka et al. |
| 8,450,443 B2 | 5/2013 | Williams et al. |
| 8,742,022 B2 | 6/2014 | Pokorny et al. |

(Continued)

FOREIGN PATENT DOCUMENTS

| | | |
|---|---|---|
| CN | 107987790 A | 5/2018 |
| JP | H11228905 A | 8/1999 |

(Continued)

OTHER PUBLICATIONS

Extended European Search Report dated Apr. 8, 2020 for corresponding European Application No. 19193042.9.

(Continued)

*Primary Examiner* — Anthony J Frost
(74) *Attorney, Agent, or Firm* — Harness, Dickey & Pierce, P.L.C.

(57) ABSTRACT

A composition includes a copolymer including a specific structural unit and a solvent, wherein the copolymer further includes a specific functional group at at least one terminal end. A film may include a cured product of the composition. A stacked structure may include a substrate film and the film on at least one surface of the substrate film. A display device may include the stacked structure. An electronic device may include the display device.

15 Claims, 10 Drawing Sheets

(56) References Cited

U.S. PATENT DOCUMENTS

| | | |
|---|---|---|
| 8,940,805 B2 | 1/2015 | Shim et al. |
| 9,249,338 B2 | 2/2016 | Park et al. |
| 9,296,904 B2 | 3/2016 | Pokorny et al. |
| 9,296,905 B2 | 3/2016 | Pokorny et al. |
| 9,637,644 B2 | 5/2017 | Ham et al. |
| 10,023,751 B2 | 7/2018 | Hu et al. |
| 2006/0188664 A1* | 8/2006 | Ando .................... C09D 183/04 428/1.1 |
| 2010/0240842 A1 | 9/2010 | Frank et al. |
| 2011/0105663 A1* | 5/2011 | Jung ...................... C08G 77/50 524/267 |
| 2012/0174823 A1* | 7/2012 | Ham .................... C09D 183/04 106/287.14 |
| 2013/0009200 A1* | 1/2013 | Ko .......................... C08L 83/04 257/100 |
| 2013/0025503 A1 | 1/2013 | Park et al. |
| 2015/0159044 A1 | 6/2015 | Bae et al. |
| 2017/0130096 A1 | 5/2017 | Grunlan et al. |
| 2017/0158910 A1 | 6/2017 | Ham et al. |
| 2019/0077972 A1 | 3/2019 | Hu et al. |

FOREIGN PATENT DOCUMENTS

| | | |
|---|---|---|
| JP | 2017021681 A | 1/2017 |
| JP | 2017534724 A | 11/2017 |
| KR | 0185679 | 4/1999 |
| KR | 20100017515 A | 2/2010 |
| KR | 20110076362 A | 7/2011 |
| KR | 20120080880 A | 7/2012 |
| KR | 20130125654 A | 11/2013 |
| KR | 20140004124 A | 1/2014 |
| KR | 20140119025 A | 10/2014 |
| KR | 101501682 B1 | 3/2015 |
| KR | 101546729 B1 | 8/2015 |
| KR | 20170127323 A | 11/2017 |
| KR | 101860710 B1 | 5/2018 |

OTHER PUBLICATIONS

Langmuir, 'Interfacial Friction and Adhesion of Polymer Brushes' ACS Publications, 2011, 27, pp. 9387-9395.

* cited by examiner

COMPOSITIONS, FILMS COMPRISING CURED PRODUCTS OF THE SAME, STACKED STRUCTURES COMPRISING THE FILMS, AND DISPLAY DEVICES

CROSS-REFERENCE TO RELATED APPLICATION

This application claims priority to and the benefit of Korean Patent Application No. 10-2018-0158344 filed in the Korean Intellectual Property Office on Dec. 10, 2018, the entire contents of which are incorporated herein by reference.

BACKGROUND

1. Field

Compositions, films comprising cured products of the same, stacked structures comprising the films, and display devices are disclosed.

2. Description of the Related Art

Portable electronic devices such as smart phones or tablet PCs may include a functional layer having the various functions. In particular, recently, as touch screen panels configured to recognize a contact position using a finger or a tool are universalized, a functional layer may be applied on the surface of a touch screen display panel in order to improve a surface slipping property and a sense of touch of a touch screen panel.

However, this functional layer has a weak fingerprint resistance or slip property, so that fingerprint visibility and slip sensation may be easily lost or destroyed by frequent contact, resulting in a sudden loss of its function.

SUMMARY

Some example embodiments provide a composition that simultaneously satisfies fingerprint visibility and slip properties.

Some example embodiments provide a film including a cured product of the composition.

Some example embodiments provide a stacked structure including the film.

Some example embodiments provide a display device including the stacked structure.

According to some example embodiments, a composition may include a copolymer and a solvent. The copolymer may include a structural unit represented by Chemical Formula 1 or Chemical Formula 2. The copolymer may further include a functional group represented by Chemical Formula 3 at at least one terminal end of the copolymer,

[Chemical Formula 1]

[Chemical Formula 2]

[Chemical Formula 3]

In Chemical Formula 1 to Chemical Formula 3, $R^1$ and $R^2$ may be independently a substituted or unsubstituted C1 to C20 alkyl group, $R^3$ to $R^5$ may be independently a hydrogen atom, a halogen atom, or a substituted or unsubstituted C1 to C20 alkoxy group, and $L^1$ may be a substituted or unsubstituted C1 to C20 alkylene group.

The copolymer may further include a substituted or unsubstituted C1 to C20 alkylene group between the structural unit and the functional group.

$L^1$ may be *—$CH_2CH_2$—*, or *—$CH_2CHCH_3$—*.

$R^1$ and $R^2$ may be independently a methyl group, and $R^3$ to $R^5$ may be independently a methoxy group or an ethoxy group.

The copolymer may include a repeating unit represented by Chemical Formula 4 and a repeating unit represented by Chemical Formula 5 in a mole ratio of about 10:90 to about 40:60,

[Chemical Formula 4]

[Chemical Formula 5]

In Chemical Formula 4 and Chemical Formula 5, $R^1$ and $R^2$ may be independently a substituted or unsubstituted C1 to C20 alkyl group, and $L^1$ may be a substituted or unsubstituted C1 to C20 alkylene group.

The copolymer may have a weight average molecular weight of about 2,000 g/mol to about 20,000 g/mol.

The solvent may include PGMEA, cyclohexanone, toluene, a sub-combination thereof, or a combination thereof.

A film may include a cured product of the composition.

The film may have a friction coefficient of less than or equal to about 0.4, a water contact angle of less than or equal to about 65°, and an oil contact angle of less than or equal to about 45°.

A stacked structure may include a substrate film, and the film on at least one surface of the substrate film.

A display device may include the stacked structure.

According to some example embodiments, a display device may include a display panel configured to display an image, and a film on an outer surface of the display panel. The film may include a copolymer including a structural unit represented by Chemical Formula 1 or Chemical Formula 2, wherein the copolymer further includes a functional group represented by Chemical Formula 3 at least one terminal end of the copolymer,

[Chemical Formula 1]

[Chemical Formula 2]

[Chemical Formula 3]

In Chemical Formula 1 to Chemical Formula 3, $R^1$ and $R^2$ may be independently a substituted or unsubstituted C1 to C20 alkyl group, $R^3$ to $R^5$ may be independently a hydrogen atom, a halogen atom, or a substituted or unsubstituted C1 to C20 alkoxy group, and $L^1$ may be a substituted or unsubstituted C1 to C20 alkylene group.

The display device may further include a touch screen panel between the film and the display panel.

An electronic device may include the display device.

An outer surface of the film may be substantially coplanar with one or more outer surfaces of the electronic device.

The one or more outer surfaces of the electronic device may be directly adjacent to the film such that the outer surface of the film and the one or more outer surfaces of the electronic device collectively define a substantially continuous surface.

DETAILED DESCRIPTION

Example embodiments of the present disclosure will hereinafter be described in detail, and may be easily performed by a person having an ordinary skill in the related art. However, actually applied structures may be embodied in many different forms, and is not to be construed as limited to the example embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

In the drawings, parts having no relationship with the description are omitted for clarity of the embodiments, and the same or similar constituent elements are indicated by the same reference numeral throughout the specification.

As used herein, when a definition is not otherwise provided, 'substituted' may refer to replacement of a hydrogen atom of a compound by a substituent selected from a halogen atom, a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C30 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C3 to C30 heterocycloalkyl group, a sub-combination thereof, or a combination thereof.

As used herein, when a definition is not otherwise provided, 'hetero' may refer to one including 1 to 4 heteroatoms selected from N, O, S, Se, Te, Si, and P.

Hereinafter, 'combination' refers to a mixture of two or more and a stacked structure of two or more.

Hereinafter, a composition according to some example embodiments is described.

A composition according to some example embodiments includes a copolymer including 1) a structural unit represented by Chemical Formula 1 or Chemical Formula 2 and 2) a solvent, wherein the copolymer further includes a functional group represented by Chemical Formula 3 at at least one terminal end of the copolymer.

[Chemical Formula 1]

[Chemical Formula 2]

[Chemical Formula 3]

In Chemical Formula 1 to Chemical Formula 3, $R^1$ and $R^2$ are independently a substituted or unsubstituted C1 to C20 alkyl group, $R^3$ to $R^5$ are independently a hydrogen atom, a halogen atom, or a substituted or unsubstituted C1 to C20 alkoxy group, and $L^1$ is a substituted or unsubstituted C1 to C20 alkylene group.

Since the copolymer includes the structural unit represented by Chemical Formula 1 or Chemical Formula 2, a film that includes the composition may have ("may be associated with") both water repellency and lipophilicity. Restated, a film that includes the composition may be configured to be water repellent (e.g., hydrophobic) and may further be lipophilic based on including the composition and/or a cured product of the composition. Therefore, even when fingerprints on the film produced using the same are deposited, the fingerprints are not easily seen ("visible") based on the "fingerprints" including substances (e.g., oils, lipids, fats, and the like) with which the lipophilic film may interact, and slip properties and durability of the film may be improved. It will be understood that "improved" or "excellent" fingerprint visibility, as described herein, refers to "reduced" visibility, to an observer via at least the visible wavelength ray region, of a fingerprint on the film based on interaction of the lipophilic film with the fingerprint to cause the fingerprint (e.g., the material and/or residue that defines the fingerprint) to be less visible in at least the visible wavelength ray region to an external observer. In some example embodiments, the copolymer included in the composition may be a block copolymer. When the copolymer is a block copolymer, the composition, and thus a film including the composition, may have ("may be associated with") a contact angle that ensures reduced (e.g., "excellent") fingerprint visibility of a fingerprint on the composition and/or a film that includes the composition while maintaining a low coefficient of friction of the composition and/or a film that includes the composition, as compared with a composition that includes an alternate copolymer or a random copolymer structure and/or a film including such a composition. Further, when the copolymer of the composition has a structure of a triblock copolymer, synthesis of the composition including the copolymer is relatively simple. For example, a diblock copolymer consisting of a repeating unit including a siloxane group and a repeating unit including an alkyleneoxy group is difficult to synthesize and is not easy to prepare. In addition, since the triblock copolymer has a larger molecular weight than the diblock copolymer, it is also advantageous in terms of slip properties and durability with which a composition including the triblock copolymer and/or a film including the composition may be associated.

In some example embodiments, the copolymer of the composition further includes a functional group represented by Chemical Formula 3 at at least one terminal end of the copolymer, so that the copolymer may be aligned in one direction due to a difference in surface energy at both terminal ends of the copolymer.

In some example embodiments, the functional group represented by Chemical Formula 3 may be a silane group substituted with at least one halogen atom or a silane group substituted with at least one alkoxy group. In some example embodiments, the alkoxy group may be a methoxy group or an ethoxy group, but is not limited thereto. The functional group represented by Chemical Formula 3 has the above structure, and thus may be bound to a substrate or a lower layer by a hydrolysis and/or condensation polymerization reaction during coating or deposition of the composition to form a film on the substrate or lower layer.

In some example embodiments, the copolymer of the composition may further include a substituted or unsubstituted C1 to C20 alkylene group between the structural unit, which is represented by Chemical Formula 1 or Chemical Formula 2, and the functional group, which is represented by Chemical Formula 3. For example, the copolymer may further include a urethane linking group between the structural unit represented by Chemical Formula 1 or Chemical Formula 2 and the functional group represented by Chemical Formula 3. For example, the urethane linking group may be represented by Chemical Formula L-1.

[Chemical Formula L-1]

In Chemical Formula L-1, $L^2$ is a substituted or unsubstituted C1 to C20 alkylene group.

In some example embodiments, in Chemical Formula 1 and Chemical Formula 2, $L^1$ may be *—CH$_2$CH$_2$—* or *—CH$_2$CH CH$_3$—*, $R^1$ and $R^2$ may independently be a methyl group, and $R^3$ to $R^5$ may independently be a methoxy group or an ethoxy group, but example embodiments are not limited thereto.

In some example embodiments, the copolymer may include a repeating unit represented by Chemical Formula 4 and a repeating unit represented by Chemical Formula 5 in a mole ratio of about 10:90 to about 40:60.

[Chemical Formula 4]

[Chemical Formula 5]

In Chemical Formula 4 and Chemical Formula 5, $R^1$ and $R^2$ are independently a substituted or unsubstituted C1 to C20 alkyl group, and $L^1$ is a substituted or unsubstituted C1 to C20 alkylene group.

When a mole number of the repeating unit represented by Chemical Formula 4 is less than about ¼ of a mole number of the repeating unit represented by Chemical Formula 5 in the composition, a water contact angle associated with a composition that includes the copolymer and/or a film including the composition may be reduced and thus fingerprint visibility of a fingerprint on the composition and/or film may be deteriorated, such that the visibility of the fingerprint on the composition and/or film may be increased to render the fingerprint more visible to an external observer in at least the visible wavelength ray region. While when the mole number of the repeating unit represented by Chemical Formula 4 is greater than ⅔ of the mole number of the repeating unit represented by Chemical Formula 5 in the composition, a diiodomethane contact angle associated with a composition that includes the copolymer and/or a film that includes the composition may be increased and thus fingerprint visibility of a fingerprint on the composition and/or film may be deteriorated, such that the visibility of the fingerprint on the composition and/or film may be increased to render the fingerprint more visible to an external observer in at least the visible wavelength ray region.

In some example embodiments, the copolymer may have a weight average molecular weight of about 2,000 g/mol to about 20,000 g/mol. When the weight average molecular weight of the copolymer is within the range, slip properties and durability of a composition that includes the copolymer and/or a coating film that includes the composition may be improved. When the weight average molecular weight of the copolymer is outside the range, slip properties and durability of a composition that includes the copolymer and/or a film that includes the composition may be deteriorated.

The solvent may include propylene glycol methyl ether acetate (PGMEA), cyclohexanone, toluene, a sub-combination thereof, or a combination thereof, but example embodiments are not limited thereto.

The composition according to some example embodiments includes a triblock copolymer having a polysiloxane structural unit and a polyalkylene glycol structural unit aligned in one direction and included in a main chain and the functional group represented by Chemical Formula 3 at at least one terminal end of the triblock copolymer, and thereby slip properties and durability associated with the composition and/or a film including the composition, may be enhanced at the same time. It will be understood that improved and/or enhanced slip properties may refer to a surface of the composition and/or a film including the composition having a relatively low friction coefficient.

The composition may be formed into a film by a coating using a solution process or by deposition using a dry process. Accordingly, the film may be a coating film or a deposition film. The coating film may be obtained by coating a solution in which the above surface coating materials are dissolved or dispersed in a solvent, for example by spin coating, slit coating, ink jet printing, or dipping, and then drying. The deposition film may be for example obtained by thermal deposition, vacuum deposition, or chemical vapor deposition (CVD).

The film may be formed on a substrate film and the substrate film may be, for example a glass substrate, a metal plate, or a polymer film, but is not limited thereto.

The film may include a cured product of the composition. The film may have improved slip properties (e.g., reduced friction coefficient of a surface of the film), fingerprint visibility (e.g., reduced visibility of a fingerprint on the film), and durability based on including a cured product of the composition. A cured product of the composition may include a "dried" product of the composition, for example a product of the composition wherein the solvent is removed such that the copolymer as described herein remains without the solvent.

In some example embodiments, the polysiloxane structural unit is configured to be bound to the substrate side of the film (e.g., bound to a substrate on which the film is formed) and the polyalkylene glycol structural unit may be aligned on the surface (air) side.

The film including the composition may have ("may be associated with") a high water contact angle. Accordingly, the film may have improved slip properties and water repellency. The film may have, for example, a water contact angle of greater than or equal to about 60°, greater than or equal to about 62°, greater than or equal to about 63°, or greater than or equal to about 65°. Herein, the water contact angle may be measured based on using a Sessile drop technique. The water contact angle may be measured based on using water as liquid and a Drop shape analyzer (DSA100, KRUSS, Germany) as a measuring equipment.

The water contact angle may be measured based on dropping a particular (or, alternatively, predetermined) amount (about 3 ul) of water on the film.

The film including the composition may have ("may be associated with") a low oil contact angle. Accordingly, it may have good fingerprint resistance and lipophilicity, such that the visibility of a fingerprint on the composition and/or film may be reduced to render the fingerprint less visible to an external observer in at least the visible wavelength ray region. A representative material for confirming the oil contact angle is diiodomethane. A low oil contact angle means that wettability (wetting) of the oil is good and the surface has lipophilicity. The film may have, for example, an oil contact angle of greater than or equal to about 60°, for example, greater than or equal to about 49°, for example less than or equal to about 47°, or less than or equal to about 45°. Herein, the oil contact angle may be measured based on using a Sessile drop technique. The oil contact angle may be measured based on using diiodomethane as liquid as described above and a Drop shape analyzer (DSA100, KRUSS, Germany) as a measuring equipment. The oil contact angle may be measured based on dropping a particular (or, alternatively, predetermined) amount (up to about 3 ul) of diiodomethane on the film.

The film including the composition may be configured to maintain association with a low friction coefficient even after frequent rubbing. A durability of the film may be confirmed by a friction coefficient calculated based on confirming a degree of steric hindrance after a plurality of frictions. For example, the friction coefficient (a dynamic coefficient of friction) of a coating film may be determined based on attaching a rubbed subject (a 3 cm×3 cm urethane pad) to a weight floor of 206 g, placing it on a coating film coated with a composition according to some example embodiments, and sliding it (a sliding speed: 150 mm/sec) to calculate a degree of steric hindrance (Material Studio/Synthia module) and then to convert it into a dynamic coefficient of friction. Herein, the friction coefficient of a film including the composition may be less than or equal to about 0.4, for example less than or equal to about 0.3, less than or equal to about 0.2, or less than or equal to about 0.1.

Some example embodiments may provide a stacked structure including a substrate film and a film including the composition that is disposed on at least one surface of the substrate film.

The stacked structure may further include at least one layer between the substrate film and the film.

The stacked structure may be a transparent film, for example a transparent flexible film.

In some example embodiments, the film or the stacked structure may be attached on a display panel. A display panel may be a device configured to display an image, for example based on emitting light and/or a pattern of light having one or more various wavelengths. Herein, the display panel and the film or the stacked structure may be directly bonded or may be bonded by interposing an adhesive. The display panel may be for example a liquid crystal panel or an organic light emitting panel, but is not limited thereto. The film or the stacked structure may be disposed on the side of an observer.

Figure 1:
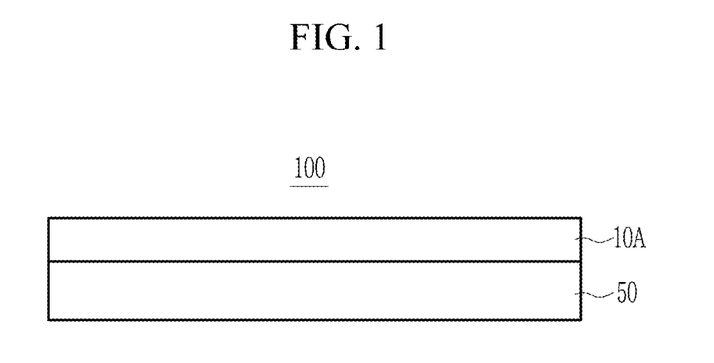
FIG. 1 is a cross-sectional view showing a display device according to some example embodiments.

FIG. 1 is a cross-sectional view showing a display device according to some example embodiments.

Referring to FIG. 1, a display device 100 according to some example embodiments includes a display panel 50 and a functional film 10A. The functional film 10A may be any of the example embodiments of a film including the composition as described herein.

The display panel 50 may be, for example, an organic light emitting panel or a liquid crystal panel, for example a bendable display panel, a foldable display panel, or a rollable display panel. In some example embodiments, the display panel 50 may be the substrate film as described herein.

The functional film 10A may include the film or stacked structure as described herein with reference to any example embodiments and may be disposed on the side of an observer (e.g., between the display panel 50 and an exterior of the display device 100). Another layer may be further disposed between the display panel 50 and the functional film 10A and may include for example a monolayer or plural layers of polymer layer (not shown) and optionally a transparent adhesive layer (not shown).

Figure 2:
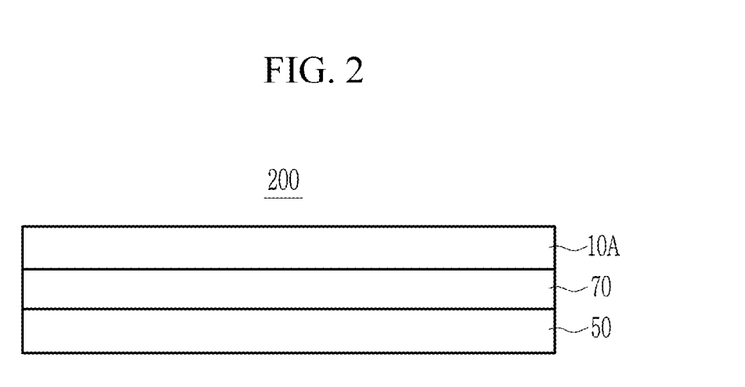
FIG. 2 is a cross-sectional view showing a display device according to some example embodiments.

FIG. 2 is a cross-sectional view showing a display device according to some example embodiments.

Referring to FIG. 2, a display device 200 according to some example embodiments includes a display panel 50, a functional film 10A, and a touch screen panel 70 disposed between the display panel 50 and the functional film 10A.

The display panel 50 may be for example an organic light emitting panel or a liquid crystal panel, for example a bendable display panel, a foldable display panel, or a rollable display panel.

The functional film 10A may include the film or the stacked structure and may be disposed on the side of an observer.

The touch screen panel 70 may be disposed adjacent to each of the functional film 10A and the display panel 50 to configure the touch screen panel 70 recognize the touched position and the position change when is touched by a human hand or an object through the functional film 10A and then to output a touch signal (e.g., to a processor of the display device 200 and/or a processor of an electronic device that includes the display device 200). The driving module (not shown) may monitor a position where is touched from the output touch signal; recognize an icon marked at the touched position, and control to carry out functions corresponding to the recognized icon, and the function performance results are displayed on the display panel 50. In some example embodiments, the touch screen panel 70 may be the substrate film as described herein. In some example embodiments, a combination of the touch screen panel 70 and the display panel 50 may be the substrate film as described herein.

Another layer may be further disposed between the touch screen panel 70 and functional film 10A and may include for example a monolayer or plural layers of polymer layer (not shown) and optionally a transparent adhesive layer (not shown).

Another layer may be further interposed between the touch screen panel 70 and the display panel 50 and may include for example a monolayer or plural layers of polymer layer (not shown) and optionally a transparent adhesive layer (not shown).

The functional film 10A including the film or the stacked structure may be applied to a variety of electronic devices such as a display device, for example a smart phone, a tablet PC, a camera, a touch screen device, and so on, but is not limited thereto.

Figure 6A:
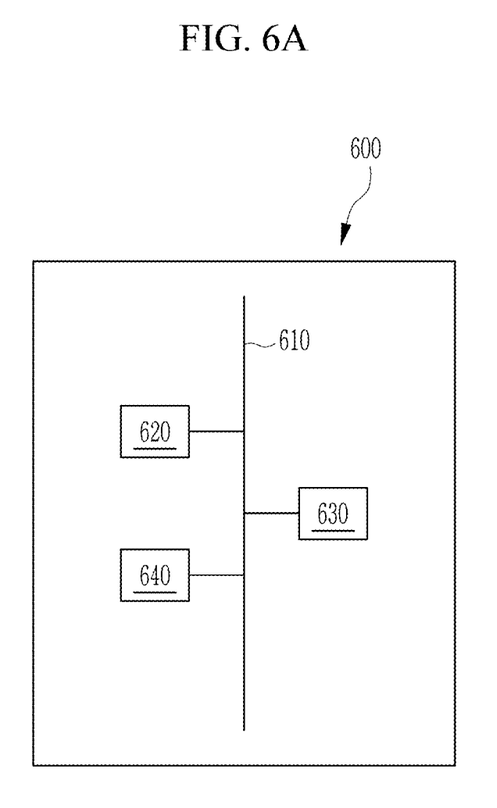
FIG. 6A is a schematic diagram of an electronic device according to some example embodiments.

FIG. 6A is a schematic diagram of an electronic device 600 according to some example embodiments.

As shown in FIG. 6A, an electronic device 600 may include a processor 620, a memory 630, and a display device 640 that are electrically coupled together via a bus 610. The display device 640 may be a display device any of the example embodiments as described herein (e.g., display device 100 and/or display device 200), including a display device including at least a display panel and a film that includes any of the example embodiments of compositions described herein. The memory 630, which may be a non-transitory computer readable medium, may store a program of instructions. The processor 620 may execute the stored program of instructions to perform one or more functions. For example, the processor 620 may be configured to process electric signals generated by the display device 640. The processor 620 may be configured to generate an output (e.g., an image to be displayed on the display device 640) based on processing the electric signals.

Figure 6B:
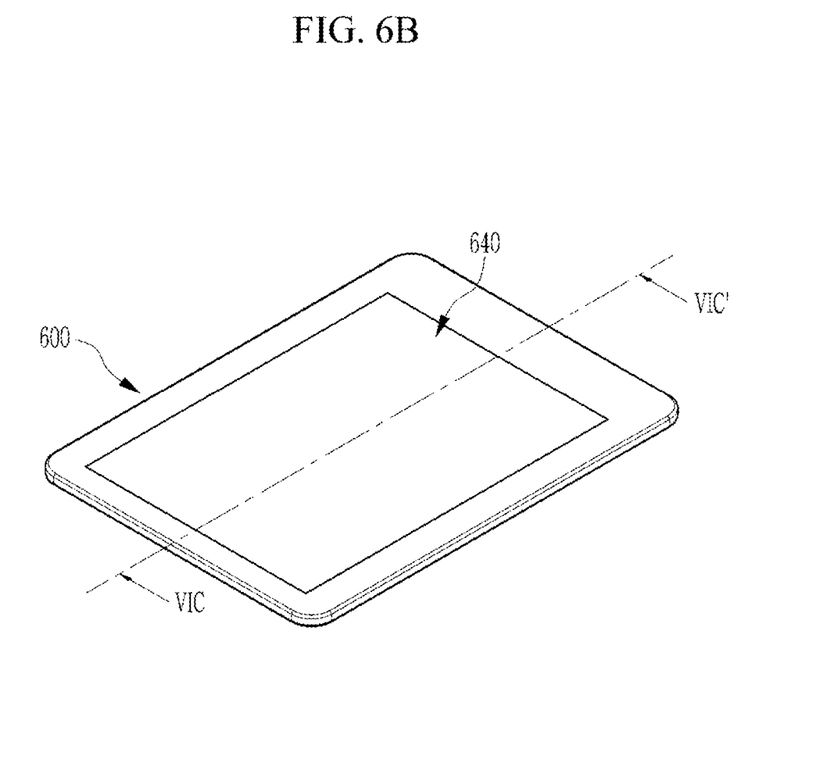
FIG. 6B is a perspective view of an electronic device according to some example embodiments.
Figure 6C:
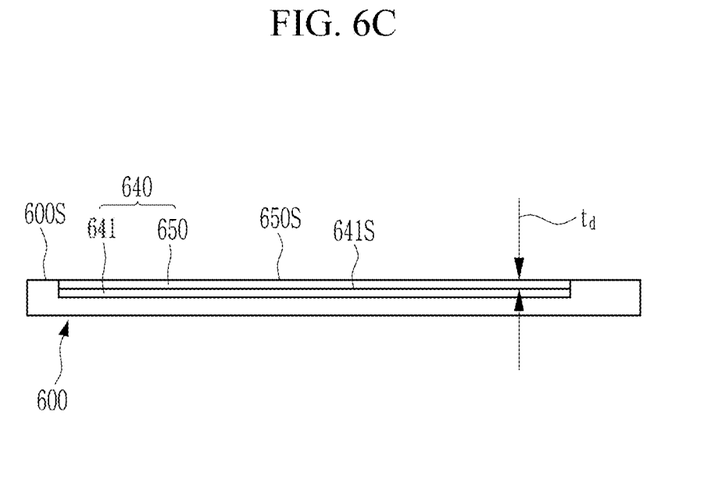
FIG. 6C is a cross-sectional view, along view line VIC-VIC' of FIG. 6B, of the electronic device of FIG. 6B according to some example embodiments.

FIG. 6B is a perspective view of an electronic device 600 according to some example embodiments. FIG. 6C is a cross-sectional view, along view line VIC-VIC' of FIG. 6B, of the electronic device 600 of FIG. 6B according to some example embodiments. The electronic device 600 shown in FIGS. 6B-6C may be the electronic device 600 shown in FIG. 6A.

As shown in FIGS. 6B-6C, an electronic device 600 may include a display device 640 that includes a display panel 641 and a film 650 on the display panel 641. The film 650 may be partially or completely transparent in at least some or all of the visible wavelength ray regions and/or some or all non-visible wavelength ray regions, such that the display panel 641 may be partially or completely observable from an exterior of the electronic device 600 through the film 650. As shown in FIG. 6C, the display device 640 may be configured such that the outer surface 650S of the film 650 is coplanar ("flush") or substantially coplanar ("substantially flush") (e.g., coplanar within manufacturing tolerances and/or material tolerances) with one or more outer surfaces 600S of the electronic device 600, including one or more outer surfaces 600S that may be directly adjacent to the outer surface 650S so that the outer surface 650S and the one or more outer surfaces 600S collectively define a continuous or substantially continuous (e.g., continuous within manufacturing tolerances and/or material tolerances) surface of at least a portion of the electronic device 600. As shown, the display device 640 is configured to cause the outer surface 650S to be coplanar or substantially coplanar with the one or more outer surfaces 600S based on the display panel 641 being inset into the volume space defined by the outer surfaces 600S of the electronic device 600 by an inset distance "td" that matches or substantially matches (e.g., matches within manufacturing tolerances and/or material tolerances) the thickness of the film 650, as shown in FIG. 6C.

As shown in FIG. 6C, the display device 640 may have all of the features of the display device 100 shown in FIG. 1, where the film 650 may have all of the features of film 10A and the display panel 641 may have all of the features of display panel 50. It will also be understood that, in some example embodiments, the display device 640 may have all of the features of the display device 200 shown in FIG. 2, where the film 650 may have all of the features of film 10A, the display panel 641 may have all of the features of display panel 50, and the display device 640 may further include a touch screen panel 70 interposing between the display panel 641 and the film 650, where the display panel 641 may be inset into the volume space defined by the outer surfaces 600S of the electronic device 600 by an inset distance "td" that matches or substantially matches (e.g., matches within manufacturing tolerances and/or material tolerances) the combined thickness of the film 650 and the touch screen panel 70, and the touch screen panel 70 may be inset into the volume space defined by the outer surfaces 600S of the electronic device 600 by an inset distance that matches or substantially matches (e.g., matches within manufacturing tolerances and/or material tolerances) the thickness of the film 650.

While FIG. 6C shows example embodiments where the outer surface 650S is coplanar or substantially coplanar with a one or more outer surfaces 600S of the electronic device 600, it will be understood that example embodiments are not limited thereto. For example, in some example embodiments, an outer surface 641S of the display panel 641 or touch screen panel 70 of the display device 640 may be coplanar or substantially coplanar with the one or more outer surfaces 600S of the electronic device 600, such that the outer surface 650S of the film 650 protrudes outward from a plane defined by the one or more outer surfaces 600S of the electronic device 600 by a distance corresponding to the thickness of the film 650.

Figure 7A:
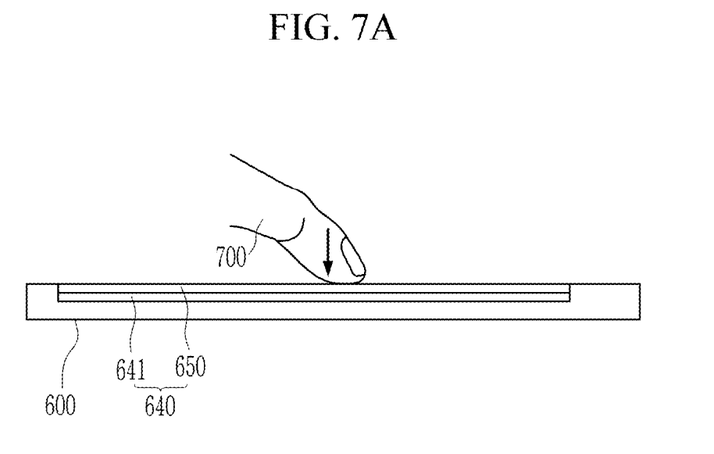
FIG. 7A is a cross-sectional view, along view line VIC-VIC' of FIG. 6B, of the electronic device of FIG. 6B according to some example embodiments.
Figure 7B:
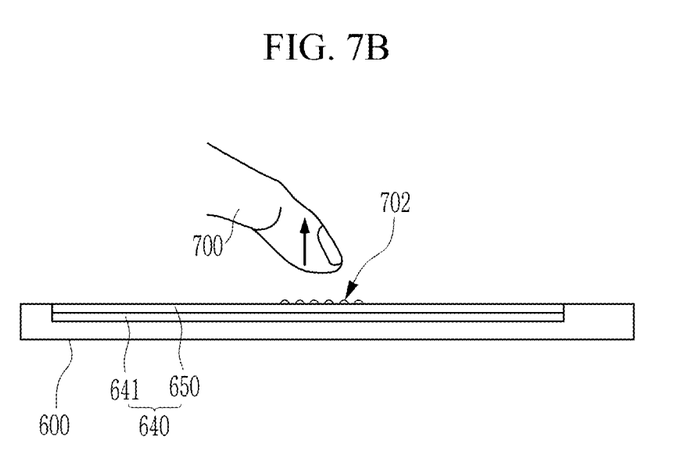
FIG. 7B is a cross-sectional view, along view line VIC-VIC' of FIG. 6B, of the electronic device of FIG. 6B according to some example embodiments.

FIG. 7A is a cross-sectional view, along view line VIC-VIC' of FIG. 6B, of the electronic device of FIG. 6B according to some example embodiments, and FIG. 7B is a cross-sectional view, along view line VIC-VIC' of FIG. 6B, of the electronic device of FIG. 6B according to some example embodiments.

As shown in FIGS. 7A-7B, a human finger 700 may move into contact with the outer surface 650S of the film 650 which defines an outer surface of the display device 640 (FIG. 7A) and may subsequently break contact with the outer surface 650S (FIG. 7B). As shown in FIG. 7B, the human finger 700 may deposit residue 702 on the outer surface 650S based on contact between the human finger 700 and the outer surface 650S. Such residue 702 may define a pattern that corresponds to an outer surface of the human finger. Accordingly, the residue 702 may, in some example embodiments, define and/or comprise a "fingerprint" as the term is commonly known, such that the residue 702 may be simply referred to as "material" comprising a fingerprint. Additionally, the residue 702 at least partially comprising a fingerprint may be simply referred to as a fingerprint 702.

In some example embodiments, the residue 702 may include various substances, including oils, skin debris, fats, or the like. As noted above, the film 650 may include a composition that configures the film 650 to have improved lipophilicity. As a result of such configuration, the film may be configured to interact with the residue 702, based on having improved lipophilicity, to reduce the visibility, at least in visible wavelength ray regions, of the residue 702 to an observer that is observing the display panel 641 through the film 650 from an exterior of the electronic device 600.

Figure 3:
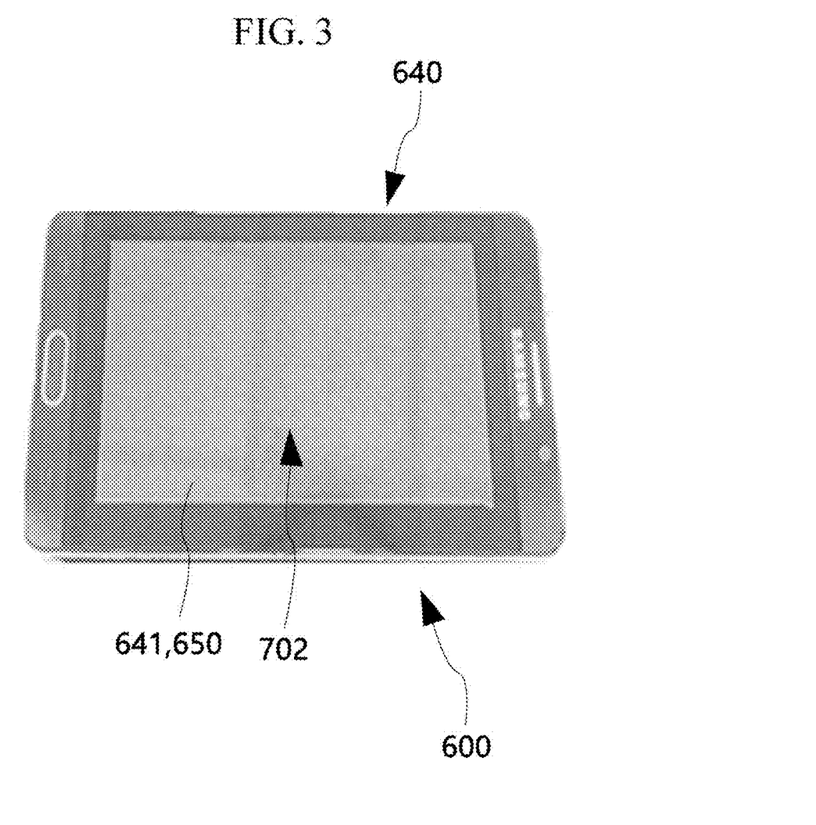
FIG. 3 is a cross-sectional photograph showing a display device according to Example 1.
Figure 4:
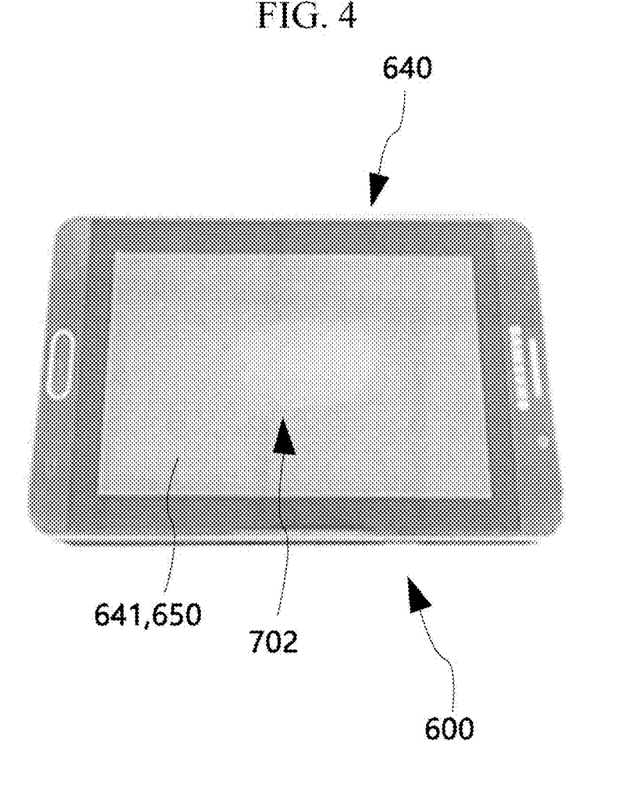
FIG. 4 is a cross-sectional photograph showing a display device according to Comparative Example 1.
Figure 5:
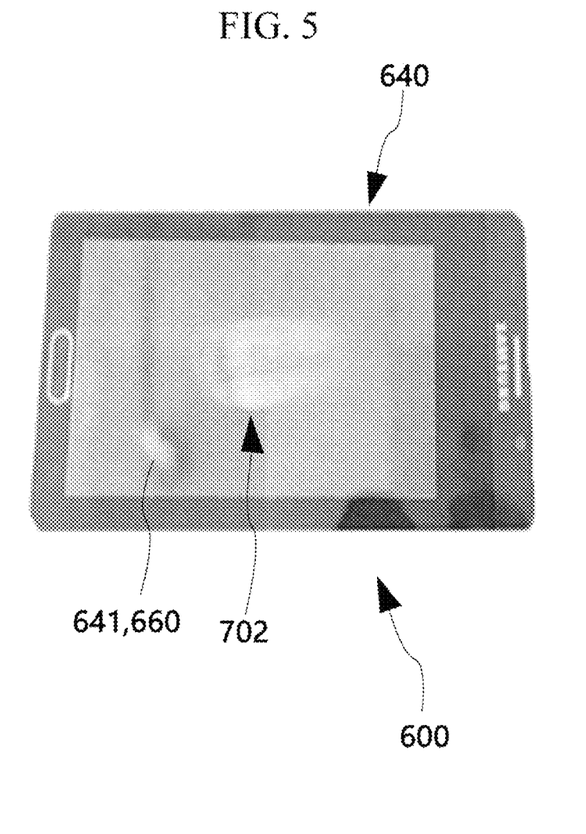
FIG. 5 is a cross-sectional photograph showing a display device according to Comparative Example 2.

Hereinafter, some example embodiments are illustrated in more detail with reference to examples, including example embodiments of electronic devices 600 that are shown in FIGS. 3-5. However, these are examples, and the inventive concepts are not limited thereto.

PREPARATION OF COPOLYMER

Preparation Example 1

HO-PPG (polypropylene glycol)/PDMS (polydimethylsiloxane)/PPG-OH (1 equivalent), I—$(CH_2)_3$—Si $(OMe)_3$ (1 equivalent), and potassium tert-butoxide (2 equivalents) (in THF) are reacted at 80° C. for 20 minutes to prepare PPG/PDMS/PPG-Si $(OMe)_3$ (PDMS of 40 wt %).

Preparation Example 2

PPG/PDMS/PPG-Si $(OMe)_3$ is prepared according to the same method as Preparation Example 1 except that the PDMS content is changed from 40 wt % to 30 wt %.

Preparation Example 3

PPG/PDMS/PPG-Si $(OMe)_3$ is prepared according to the same method as Preparation Example 1 except that the PDMS content is changed from 40 wt % to 20 wt %.

Comparative Preparation Example 1

PPG-Si $(OMe)_3$

Evaluation 1: Friction Coefficient

A friction coefficient (a weight: 206 g, a rubbed subject: a 3 cm×3 cm urethane pad, a sliding speed: 150 mm/sec) on each surface of separate films including the separate copolymers according to Preparation Examples 1 to 3 and Comparative Preparation Example 1 is measured, and the results are shown in Table 1.

TABLE 1

|  | Preparation Example 1 | Preparation Example 2 | Preparation Example 3 | Comparative Preparation Example 1 |
| --- | --- | --- | --- | --- |
| friction coefficient | 0.25 | 0.31 | 0.36 | 0.5 |

Referring to Table 1, the films including the copolymers according to Preparation Examples 1 to 3 exhibited a smaller friction coefficient than that of Comparative Preparation Example 1, and thus each film formed of the compositions respectively including the copolymers is expected to show excellent slip properties.

Evaluation 2-1: Fingerprint Visibility

A water contact angle and an oil contact angle of separate films including separate copolymers according to Preparation Examples 1 to 3 and Comparative Preparation Example 1 are calculated, and the results are shown in Table 2. The contact angles are measured by respectively dropping water and diiodomethane on each film and using a Drop shape analyzer (DSA100, KRUSS, Germany) and evaluated in a Sessile drop technique method.

TABLE 2

|  | Preparation Example 1 | Preparation Example 2 | Preparation Example 3 | Comparative Preparation Example 1 |
| --- | --- | --- | --- | --- |
| Water contact angle (°) | 71.9 | 67.7 | 65.5 | 118 |
| Oil contact angle (°) | 44.4 | 40.6 | 35.7 | 95 |

Referring to Table 2, the films including the copolymers according to Preparation Examples 1 to 3 had a water contact angle of less than or equal to about 65° and an oil contact angle of less than or equal to about 45° unlike the films including the copolymer of Comparative Preparation Example 1, and accordingly, each film formed of the compositions respectively including the copolymers according to Preparation Examples 1 to 3 is expected to show excellent fingerprint visibility.

Manufacture of Composition and Film

Example 1

The copolymer according to Preparation Example 1 at a concentration of 20 wt % is mixed with a toluene solvent to prepare a composition.

The composition is dry-coated on a tempered glass to form a 10 nm thick film.

Example 2

A film is formed according to the same method as Example 1 except that the copolymer according to Preparation Example 2 is used instead of the copolymer according to Preparation Example 1.

Example 3

A film is formed according to the same method as Example 1 except that the copolymer according to Preparation Example 3 is used instead of the copolymer according to Preparation Example 1.

Comparative Example 1

A film is formed according to the same method as Example 1 except that the copolymer according to Comparative Preparation Example 1 is used instead of the copolymer according to Preparation Example 1.

Comparative Example 2

A tempered glass

Evaluation 2-2: Fingerprint Visibility

A fingerprint is respectively imprinted on the films of Example 1 and Comparative Example 1 and the tempered glass of Comparative Example 2, and photographs thereof are shown in FIGS. 3 to 5. Restated, FIG. 3 shows a view of an electronic device 600 that includes a display device 640 that includes the film 650 of Example 1 on a display panel 641 of the display device 640, FIG. 4 shows a view of an electronic device 600 that includes a display device 640 that includes the film 650 of Comparative Example 1 on a display panel 641 of the display device 640, and FIG. 5 shows a view of an electronic device 600 that includes a display device 640 that includes tempered glass 660 on a display panel 641 of the display device 640. Referring to FIG. 3 to FIG. 5, since a fingerprint (e.g., residue 702) is put on each of the films 650 of Example 1 and Comparative Example 1, and the tempered glass 660 of Comparative Example 2, but the fingerprint 702 on the film 650 of Example 1 (FIG. 3) is less visible, at least in the visible wavelength ray region, in comparison with the fingerprint 702 on the film 650 of Comparative Example 1 (FIG. 4) and the tempered glass 660 of Comparative Example 2, the film 650 of Example 1 (FIG. 3) exhibits relatively excellent fingerprint visibility (e.g., exhibits reduced visibility of a fingerprint 702 on the film 650) in relation to the film 650 of Comparative Example 1 and the tempered glass 660 of Comparative Example 2 based on including the composition of Example 1.

While this disclosure has been described in connection with what is presently considered to be practical example embodiments, it is to be understood that the inventive concepts are not limited to the disclosed example embodiments, but, on the contrary, are intended to cover various modifications and equivalent arrangements included within the spirit and scope of the appended claims.

What is claimed is:

1. A composition, comprising:
a copolymer comprising
a structural unit represented by Chemical Formula 4 and a structural unit represented by Chemical Formula 5 in a mole ratio of about 20:80 to about 40:60, and
a functional group represented by Chemical Formula 3 at at least one terminal end of the copolymer, and
a solvent:

[Chemical Formula 4]

[Chemical Formula 5]

[Chemical Formula 3]

wherein, in Chemical Formula 3 to Chemical Formula 5,
$R^1$ and $R^2$ are independently a substituted or unsubstituted C1 to C20 alkyl group,
$R^3$ to $R^5$ are independently
a hydrogen atom,
a halogen atom, or
a substituted or unsubstituted C1 to C20 alkoxy group, and
$L^1$ is a substituted or unsubstituted C1 to C20 alkylene group.

2. The composition of claim 1, wherein the copolymer further includes a substituted or unsubstituted C1 to C20 alkylene group between the structural unit and the functional group.

3. The composition of claim 1, wherein $L^1$ is *—CH$_2$CH$_2$—*, or *—CH$_2$CHCH3—*.

4. The composition of claim 3, wherein $R^1$ and $R^2$ are independently a methyl group, and $R^3$ to $R^5$ are independently a methoxy group or an ethoxy group.

5. The composition of claim 1, wherein the copolymer has a weight average molecular weight of about 2,000 g/mol to about 20,000 g/mol.

6. The composition of claim 1, wherein the solvent includes PGMEA, cyclohexanone, toluene, a sub-combination thereof, or a combination thereof.

7. A film including a cured product of the composition of claim 1.

8. The film of claim 7, wherein the film has
a friction coefficient of less than or equal to about 0.4,
a water contact angle of less than or equal to about 65°, and
an oil contact angle of less than or equal to about 45°.

9. A stacked structure, comprising:
a substrate film, and
the film of claim 7 on at least one surface of the substrate film.

10. A display device including the stacked structure of claim 9.

11. A display device, comprising:
a display panel configured to display an image; and
a film on an outer surface of the display panel, the film including
a copolymer comprising a structural unit represented by Chemical Formula 4 and a structural unit represented by Chemical Formula 5 in a mole ratio of about 20:80 to about 40:60, and a functional group represented by Chemical Formula 3 at at least one terminal end of the copolymer,

[Chemical Formula 4]

[Chemical Formula 5]

[Chemical Formula 3]

wherein, in Chemical Formula 3 to Chemical Formula 5, $R^1$ and $R^2$ are independently a substituted or unsubstituted C1 to C20 alkyl group, $R^3$ to $R^5$ are independently a hydrogen atom, a halogen atom, or a substituted or unsubstituted C1 to C20 alkoxy group, and $L^1$ is a substituted or unsubstituted C1 to C20 alkylene group.

12. The display device of claim 11, further comprising:
a touch screen panel between the film and the display panel.

13. An electronic device, comprising the display device of claim 11.

14. The electronic device of claim 13, wherein an outer surface of the film is substantially coplanar with one or more outer surfaces of the electronic device.

15. The electronic device of claim 14, wherein the one or more outer surfaces of the electronic device are directly adjacent to the film such that the outer surface of the film and the one or more outer surfaces of the electronic device collectively define a substantially continuous surface.

* * * * *